UNITED STATES PATENT OFFICE.

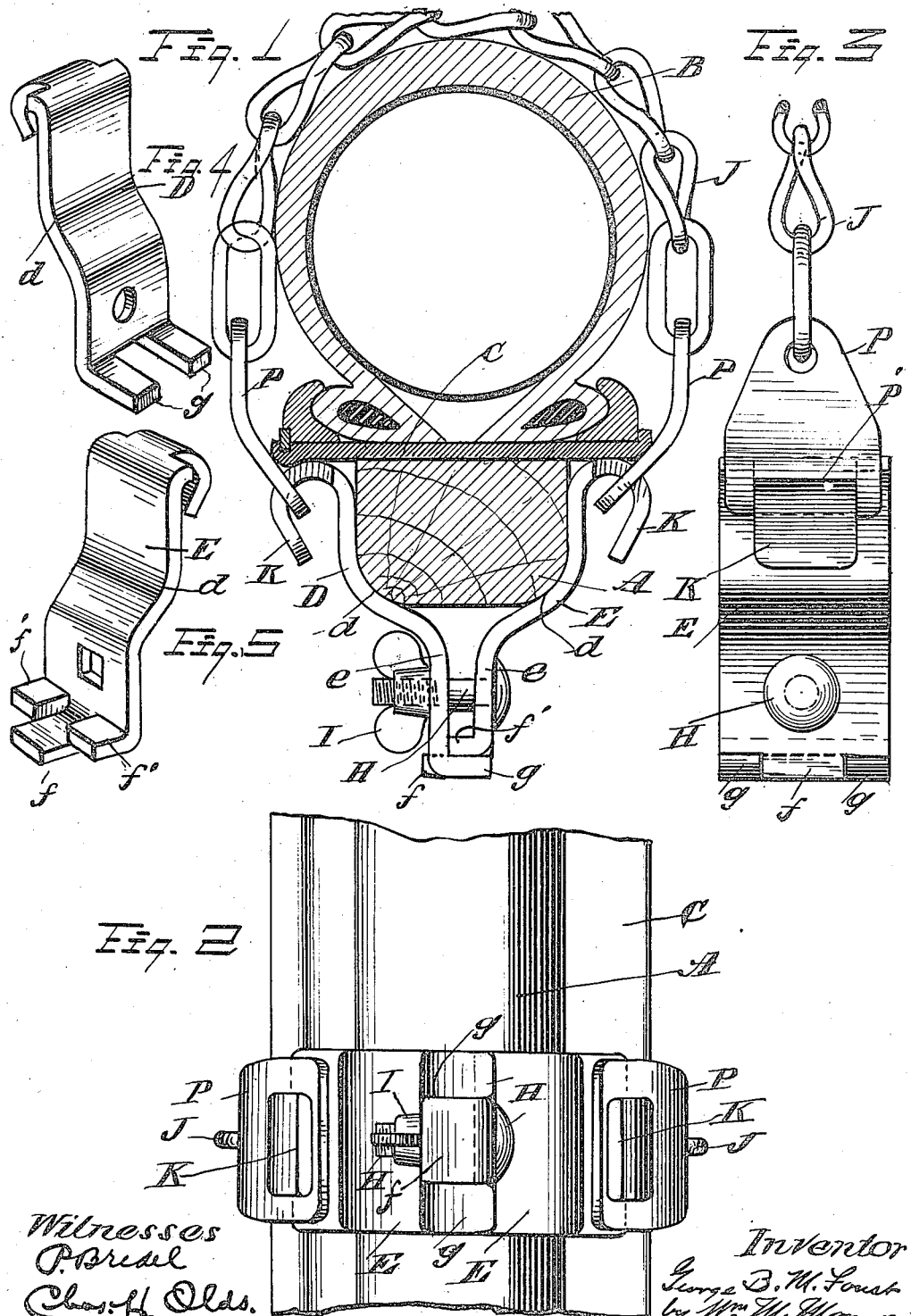

GEORGE B. M. FOUST, OF CLEVELAND, OHIO, ASSIGNOR TO CHARLES H. KEITH, OF CLEVELAND, OHIO.

ANTISKIDDING DEVICE FOR TIRES.

1,194,161.  Specification of Letters Patent.  Patented Aug. 8, 1916.

Application filed May 1, 1914. Serial No. 835,777.

*To all whom it may concern:*

Be it known that I, GEORGE B. M. FOUST, a citizen of the United States, and resident of Cleveland, in the county of Cuyahoga and State of Ohio, have invented certain new and useful Improvements in Antiskidding Devices for Tires, of which I hereby declare the following to be a full, clear, and exact description, such as will enable others skilled in the art to which it appertains to make and use the same.

The objects of the invention are to provide simple and efficient clamping devices for detachably securing a non-skidding device such as a chain or other flexible device, to the felly of an automobile or other vehicle. This chain is passed about the tire or casing so that the wheel will not skid when passing over a wet or slippery pavement, and which will provide the necessary grip for the surface of the wheel to enable it to engage sandy or muddy or icy roads without slipping.

An important advantage of the invention is found in the fact that short individual chains can be used which are quickly attached and will immediately detach themselves and fall away from the machine if broken or worn out, and thus avert injury to the brakes or mud guard, but the clamping devices will remain in position. This clamping device is portable and readily attached to and detached from the felly, and a number of them can be carried in the vehicle and as many used as desired, and they can easily be removed when the necessity for their use is passed, and no permanent attachment to the felly or tire is required.

The invention comprises a clamping device or series of separate similar clamping devices adapted to be secured to the felly and to which a non-skidding or other device can be attached, which can be loosely applied to the casing without affecting the stability of the clamping device.

The invention comprises the clamp formed in two interlocking portions adapted to engage the felly on both sides, and means for attaching the chain thereto and for rigidly securing the clamping parts together, hereinafter described, shown in the accompanying drawings and specifically pointed out in the claims.

In the accompanying drawings Figure 1 is a transverse section of a rim showing the felly, the metal rim, and the tire casing thereon, and the non-skidding device and clamping means therefor; Fig. 2 is a plan view thereof taken from the inner side of the felly; Fig. 3 is a side elevation of the clamping device showing a portion of the chain; Figs. 4 and 5 show details of the clamp.

In these views A is the felly, B the casing and C the rim upon which it is secured.

D and E are the respective portions of the clamp. These comprise sheet metal plates bent at $d$, $d$, to conform substantially to the shape of the felly so that they can be brought into contact with as much of the surface of the felly as possible. The plates D and E correspond in shape and are applied to opposite sides of the felly and are brought more closely together at $e$, $e$, where they extend parallel to each other in a radial direction. The inner ends of the clamping portions are bent at right angles and the portion E is provided with the tongue $f$ which enters between two tongues $g$, $g$, upon the portion D. Tongues $f'$, $f'$, upon the portion E are cut shorter than the other tongues and abut against the side of the portion D. A bolt H having a wing nut I is passed through both of the straight portions $e$, $e$, of the clamping plates and forces the clamping plates into engagement with the sides of the felly and the two part fulcrum upon the ends of the tongues $f'$, $f'$. A square portion upon the bolt and a square opening in one of the plates D or E prevents the bolt from turning when the nut is tightened. There is spring tension in the plates sufficient to hold the nut where it is placed. Before tightening the clamp upon the felly a chain J is passed around the casing and its end links are passed through curved plates P, P which pass around the edges of the rim C. These curved plates are provided with linear openings $p$, $p$, through which the backwardly bent or hooked extremities K of the clamping plates are inserted. The extremities K are flat and passing through linear openings are rigid and prevent any rubbing of the plates upon the rim, and hence prevent rattling or noise of any kind. The clamp is firmly secured to the felly but it is not necessary that the chain should be stretched tight upon the casing or tire. It is often preferable to use a slack chain since it does less injury to the tire.

Many advantages are found in the use of this device, which may be enumerated as follows: No more clamps with chains attached need be used than are necessary to satisfy the particular requirements of each case. When a non-skid device is required in an emergency where it would be difficult to apply a long chain and the car would have to be jacked up to apply it, one or two of these clamps and chains attached can be put on each driving wheel and the car can be immediately released and started without jacking it up. An extremely important advantage is that when the chain wears out or breaks it drops out of the hooks and falls away from the wheel, leaving the clamp in its position in the felly, so that another chain can be easily attached. By freeing itself in this manner all danger of the chain getting into the brakes or battering the mud guard is averted. All parts are small so that with a few extra chains for safety they can be carried in the vehicle and will take up very little space, also the chains being short do not retain mud or dirt. By having the clamps separately attached to the felly the chains can not slide over the surface of the tire sufficiently to catch in and tear up any rough edges of a worn tire and strip the surface as do other devices that are not rigidly clamped in place. To prevent disfiguring the varnish upon a felly, a small piece of felt can be used under each clamp if desired. A valuable advantage of the device is found in the fact that it makes it impossible for the casing to leave the wheel when the tire is deflated while running since the hooks K are long enough to prevent this result, and also when skidding or turning curves at a high rate of speed.

Having described the invention what I claim as new and desire to secure by Letters Patent is:

1. In a non-skidding attachment for a vehicle wheel having a felly, a metal rim and a resilient tire thereon, a pair of opposed clamping plates adapted to engage said felly and extend radially toward the center of the wheel, the inner ends of said plates interlocking to prevent lateral movement thereof, a flange upon the end of one plate abutting against the other plate to form a fulcrum point, a bolt and nut for adjustably securing said clamps in position, said bolt located intermediate of the outer and inner ends of said plates, attaching means upon the outer ends of said plates, and a non-skid device detachably secured to said attaching means.

2. In a non-skidding device for a wheel having a felly, a tire holding rim and a tire thereon, a pair of clamping plates shaped to conform to the felly and adapted to be attached thereto each plate having an attaching means at its outer end, interlocking tongues at the inner ends of said plates, a member at the extremity of one plate engaging the extremity of the other plate, and forming a fulcrum point thereon, a bolt adjustably connecting said plates and positioned intermediate of said fulcrum point and the outer ends of said plates, a chain adapted to encircle said tire and curved plates attachable to the outer ends of said clamping plates, and to the extremities of said chain, said curved plates adapted to pass around the edges of said rim.

In testimony whereof, I hereunto set my hand this 25th day of April, 1914.

GEORGE B. M. FOUST.

In presence of—
CHAS. H. OLDS,
WM. M. MONROE.